No. 881,231.
PATENTED MAR. 10, 1908.
L. L. FILSTRUP.
SAW SHARPENING MACHINE.
APPLICATION FILED FEB. 8, 1906.
5 SHEETS—SHEET 2.
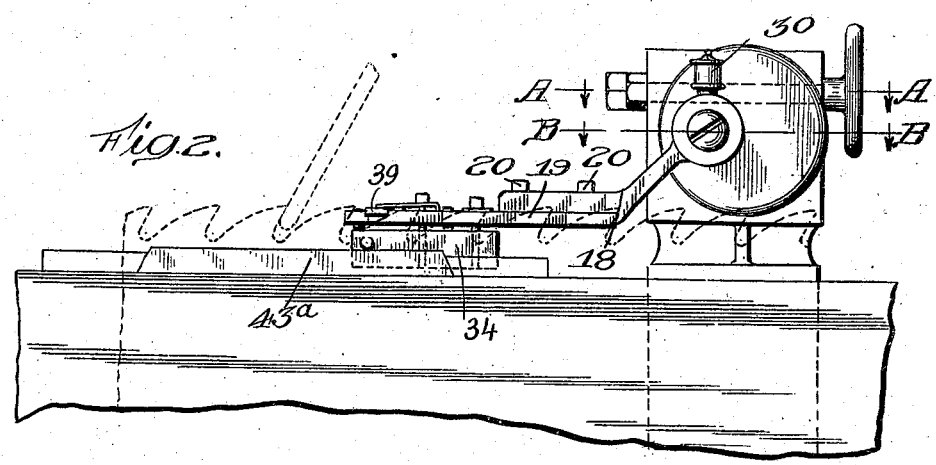
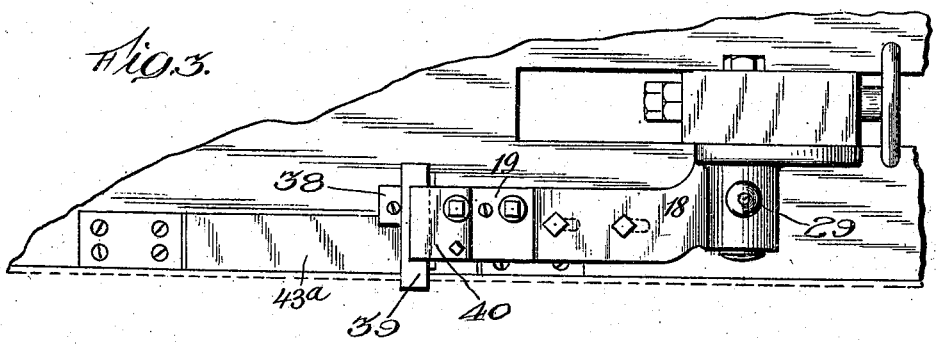
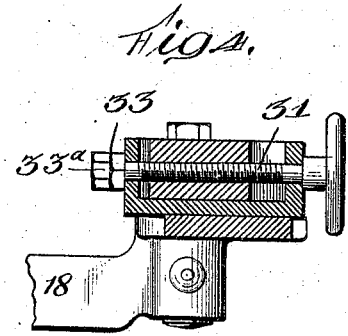
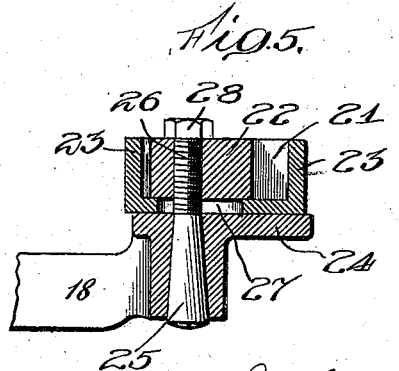
Witnesses:
Inventor:
Lars Larsen Filstrup
by Buckley & Durand
his Attorneys No. 881,231. PATENTED MAR. 10, 1908.
L. L. FILSTRUP.
SAW SHARPENING MACHINE.
APPLICATION FILED FEB. 8, 1906.
5 SHEETS—SHEET 3.
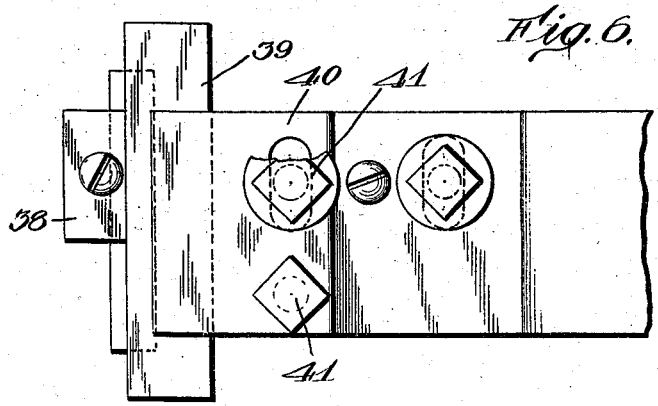
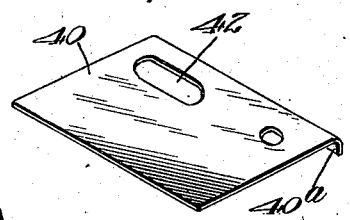
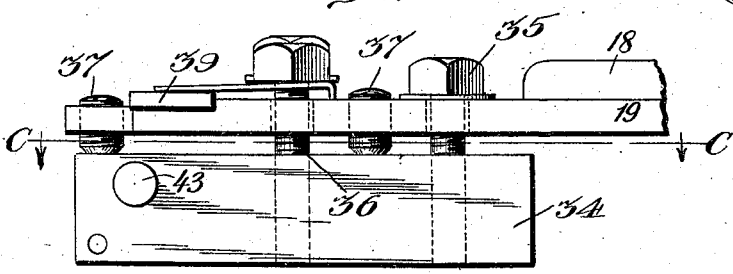
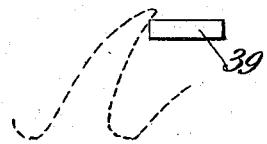
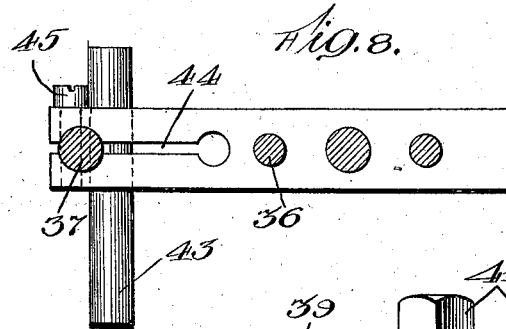
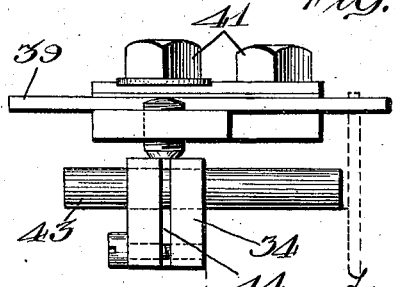
Witnesses:
J B Weir
G. V. Domarus
Inventor:
Lars Larsen Filstrup
by Bulkley & Durand
his attorneys

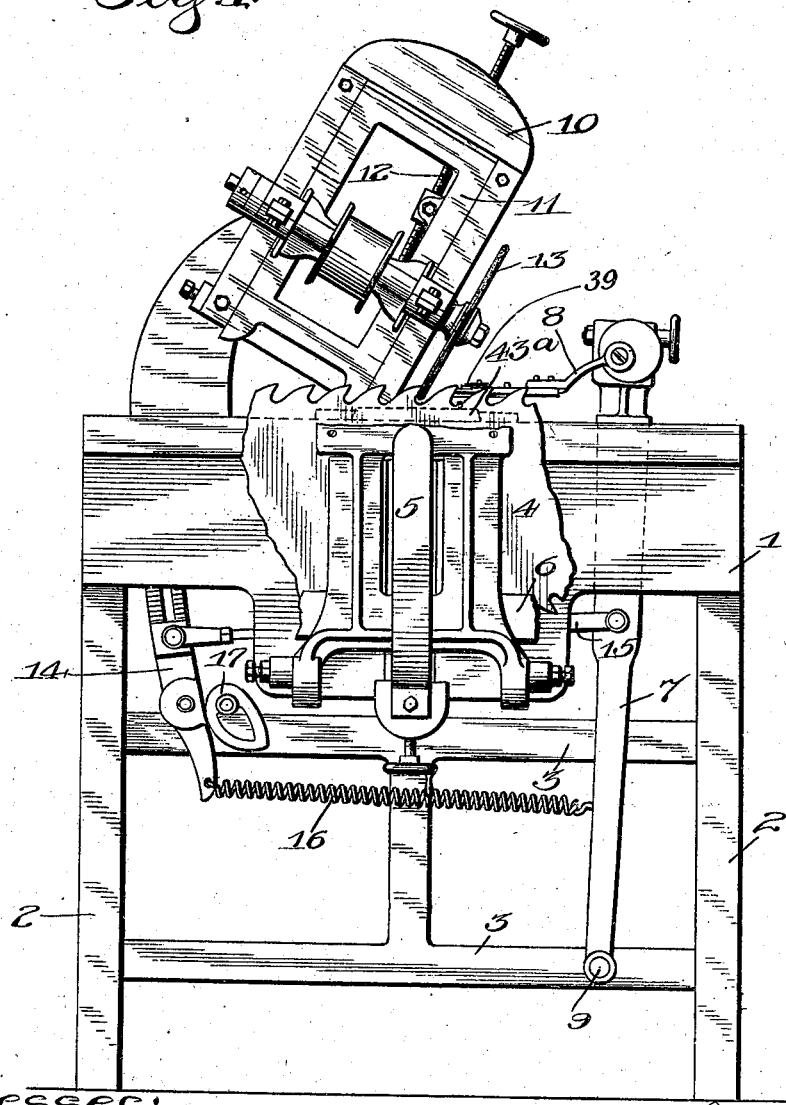

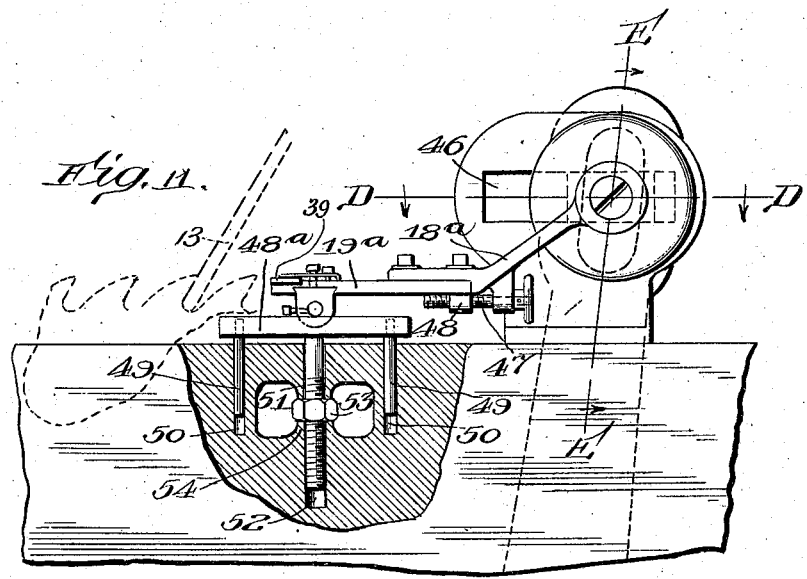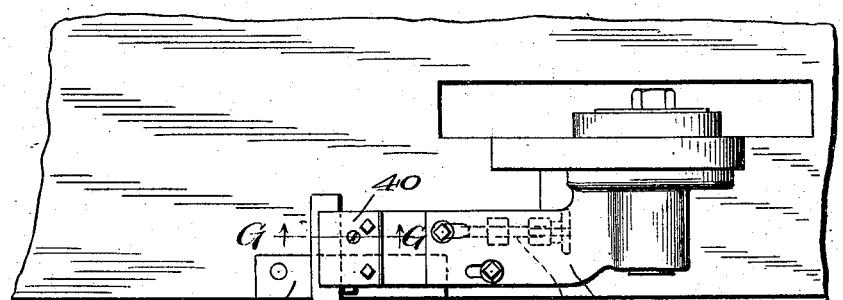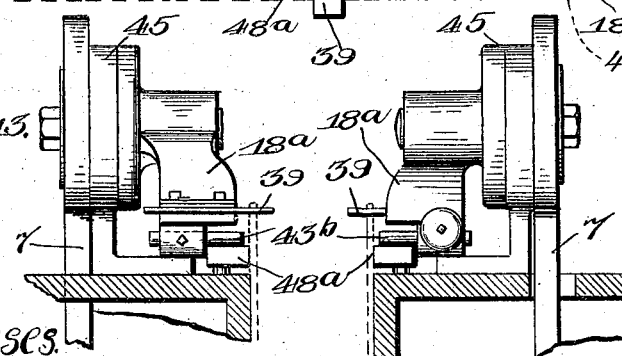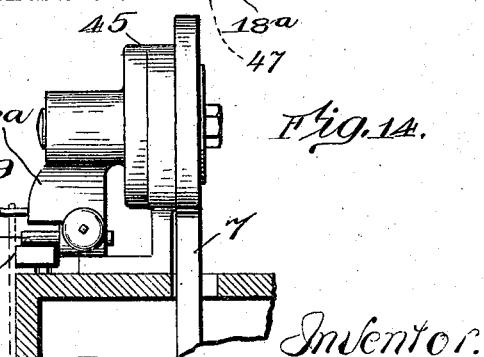

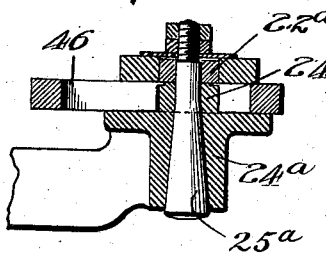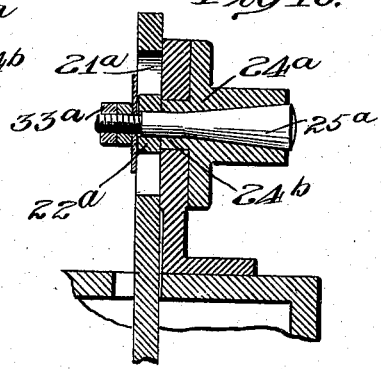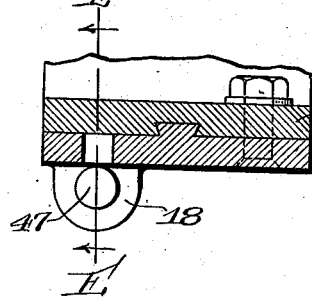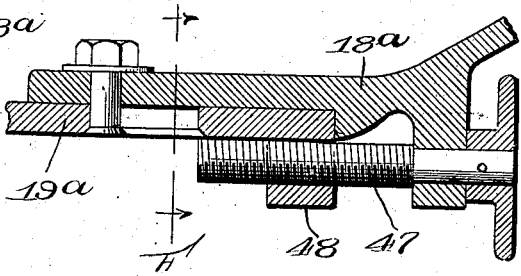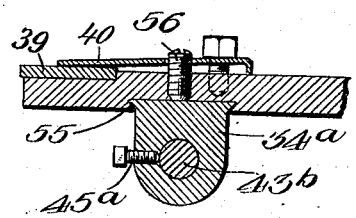

UNITED STATES PATENT OFFICE.

LARS LARSEN FILSTRUP, OF CHICAGO, ILLINOIS, ASSIGNOR TO COVEL MANUFACTURING COMPANY, OF CHICAGO, ILLINOIS, A CORPORATION OF ILLINOIS.

SAW-SHARPENING MACHINE.

No. 881,231.     Specification of Letters Patent.     Patented March 10, 1908.

Application filed February 8, 1906. Serial No. 300,080.

*To all whom it may concern:*

Be it known that I, LARS LARSEN FILSTRUP, a citizen of the United States of America, and resident of Chicago, Cook county, Illinois, have invented a certain new and useful Improvement in Saw-Sharpening Machines, of which the following is a specification.

My invention relates to improvements in saw sharpening machines, is especially adapted for use in machines for sharpening saws, and relates particularly to improved mechanism for automatically feeding the saw in coöperation with the other parts of the machine,—that is, relatively to the grinding wheel or other devices by which the desired operation is performed on the saw teeth.

The object of my invention is to provide a feed mechanism which will be positive and accurate in its action and not liable to get out of order.

A further object is to provide a feed mechanism in which the parts which are most subject to wear may be easily replaced.

These and such other objects as may more fully appear are attained by my invention, embodiments of which are illustrated in the accompanying drawings, and in which—

Figure 1 is a front elevation of a saw sharpening machine equipped with a feed device embodying the principles of my invention. Fig. 2 is an enlarged detail front elevation of the feed finger and attachments. Fig. 3 is a plan view of the devices shown in Fig. 2. Fig. 4 is a sectional view on the line A—A of Fig. 2, looking in the direction indicated by the arrows. Fig. 5 is a sectional view on line B—B of Fig. 2, looking in the direction indicated by the arrows. Fig. 6 is an enlarged detail plan view of the front end of the feed finger, showing the feed pin in position. Fig. 7 is a side elevation of the mechanism shown in Fig. 6. Fig. 8 is a sectional view on line C—C of Fig. 7, looking in the direction indicated by the arrows. Fig. 9 is an end view of the means shown in Fig. 6. Fig. 10 is a perspective view of the spring plate for holding the feed pin in position. Fig. 11 is an enlarged detail side elevation of a modified form of feed finger. Fig. 12 is a plan view of the parts shown in Fig. 11. Fig. 13 is a front elevation of the means shown in Fig. 11. Fig. 14 is a rear elevation of the devices shown in Fig. 11. Fig. 15 is a horizontal sectional view on line D—D in Fig. 11. Fig. 16 is a vertical sectional view on line E—E of Fig. 11. Fig. 17 is an enlarged detail sectional view of Fig. 11, showing the method of securing and adjusting the parts comprising the feed finger. Fig. 18 is a cross-section on line F—F of Fig. 17. Fig. 19 is an enlarged detail sectional view on line G—G of Fig. 12. Fig. 20 shows how the sharp edge or corner of the feed pin engages in the swage or slight indentation under the front of a tooth.

Like numerals of reference indicate like parts in the several figures of the drawing.

1 represents the frame of the machine; 2—2 supports therefor, and 3—3 crossbraces.

4 indicates a fragment of a saw held in place against the frame by means of a vertical guide plate and a spring hasp 5 yieldingly bearing against the plate. The saw rests upon the support or guide 6. A feed arm 7 carrying the feed finger 8 is pivoted to the frame at 9. An adjustable frame 10 for the grinding wheel gate 11, and an adjustable connecting rod 12 to which is pivoted the gate 11 carrying the grinding wheel 13, are connected to the rock arm 14 by the connecting rod 15. A spring 16 connects the lever 14 with the feed arm 7 and holds the rock arm 14 against the cam 17.

Referring now to Figs. 2 to 5, the feed finger 8 is preferably formed in two pieces—a diagonal connecting bar 18 and a horizontal carrying bar 19—secured together by bolts 20—20. The upper end of the arm 7 is provided with a recess 21 within which is set an adjusting block 22 adapted to play in the recess between the flanges 23—23 of the feed arm. The feed finger terminates in a circumferential bearing boss 24 provided with an opening through which passes a bolt 25 having a screw end 26 passing through a slot 27 in the end of the feed arm 7 in the block 22, and held in place in any well-known manner, as by a nut 28. On the top of the boss 24 is provided an opening 29 in which is seated an oil cup 30. An adjustable bolt 31 extends through the arm 7 and block 22, providing for a horizontal adjustment of the feed finger. This bolt is provided with a handle at one end and with a suitable nut 33 and jam nut 33ª at the other end. An adjustable bearing block 34 is secured below to the bottom of the carrying bar 19 of the feed finger, by means of threaded bolts 35 and 36 and a pair of stop screws 37—37 extending through the bar. The carrying bar terminates in a stop engaging lug 38. A feed pin or bar 39, preferably of hardened steel, is seated in a groove in the carrying bar near the end. This pin is held in place by a spring-plate 40 provided with a downwardly extending flange 40$^a$ through which pass the bolts 41. The bolt-hole 42 in the plate is elongated, as well as the corresponding hole in the bar, permitting a lateral adjustment of the bearing block 34. The end of the bearing block is provided with a horizontal opening in which is mounted the bearing pin 43, preferably of hardened steel, adapted to slide on a bar 43$^a$. This bearing pin is so positioned that its center is in vertical alinement with the contact point of the feed pin. The bearing block is provided with a vertical slot 44 and clamping screw 45 to clamp said bearing bar securely into position.

In Figs. 11, etc., a modification is shown in which the guide 45 inserted between the ends of the feed arm and the feed finger and secured to the frame is provided with a horizontal slot 46 within which the end of the feed finger travels, and which limits the travel in a horizontal line. The adjusting screw 47 is mounted on the bar 18$^a$ and engages a threaded nut 48 on the bar 19$^a$. A bearing bar 48$^a$ is mounted on a sliding standard 49—49 traveling in ways 50—50 in the frame, and on a threaded bolt 51 traveling in a vertical way 52. This bolt is operated by a nut 53 mounted thereon and seated on a shoulder 54 in the frame. An inwardly flaring groove 55 is channeled in the bottom of the bar 49$^a$ and a vertical bearing block 34$^a$ inserted therein and held in place by a set screw 56. A bearing pin 43$^a$ is inserted in an opening in the block 34$^a$ and secured in place by a set screw 45$^a$. At the top of the feed arm is an opening 21$^a$ in which is seated a roll 22$^a$, and the boss 24$^a$ has an inwardly projecting cylindrical portion 24$^b$ seated in the guide 45, and the bar 18$^a$ is held in place by a tapered bolt 25$^a$ passing through the boss 24$^a$, the projection 24$^b$ and the roll 22$^a$, and secured at the end by nuts 33$^a$.

Referring now to the operation of the machine, power is supplied in any well known manner through the medium of the levers and cams as, for instance, that shown and described in Letters Patent No. 654,844, Henry P. Schofield, assignor to L. L. Filstrup.

With the saw in position to commence operation on the tooth, the feed pin 39 presses against the tooth immediately preceding. As the guide wheel is carried down the front of the tooth, the feed finger travels back, riding over the back of the tooth as shown in Fig. 2. When the grinding wheel has reached the throat of the tooth, the feed pin engages the front of the next tooth near the top. The grinding wheel is raised and the feed pin pushes the saw along to bring the next tooth in position to be operated on by the grinding wheel. The grinding wheel follows along the top of the tooth as the feed pin pushes the saw along bringing the next tooth to be operated on by the grinding wheel. When the saw is being moved forward, the bearing pin 43 slides on the block 43$^a$ and the side of the bearing block 34 is closely braced against the side of the block which is rigidly secured in place on the top of the frame. The bars, block and feed pin are all preferably of hardened steel, and the wear on the adjustable parts is easily compensated. The bearing pin, being preferably round, can, in the event of becoming flattened by sliding over the block, be turned slightly, forming a new point of contact, and the feed pin can be moved horizontally in order to bring a new point of contact with the tooth of the saw. The vertical adjustment of the bearing block makes it possible to bring the pressure against any desired point in the face of the tooth, and permits the accommodation of the machine to different sizes of saws with the least possible readjustment of parts. The point of contact of the feed pin being vertically above the center of the bearing pin, almost perfect horizontal travel is assured, and the feed pin maintains at all times the same vertical position with respect to the teeth, which point is of the utmost importance in machinery of this character, as any deviation between the relative positions of the teeth at different stages of the grinding operation renders the work of the grinding wheel irregular and unsatisfactory, and makes the face of the saw teeth rough and jagged. At the same time, if there is a difference in the horizontal alinement, there will be a corresponding difference between the height of the various teeth, and in the event that the apex of a tooth extends above those near it, the bulk of the work of the saw is thrown upon that tooth, rendering it more liable to become broken.

In my modification shown in Figs. 11, etc., the accuracy of the horizontal travel of the feed finger is further assured, and the adjustment of the feed finger is simplified. The vertical adjustment of the feed pin and bearing pin is accomplished by raising or lowering the block 48$^a$ by means of the nut 53, as shown in Fig. 11.

The different saw filers using devices of this character have different ideas with respect to the proper point at which the feed should engage the tooth. Some require a machine in which the feed pin engages the tooth near its apex, while others prefer a machine in which the engagement is in the throat. My device is such that it may be adjusted vertically to meet the varying wants of the purchasers or users.

As shown in Fig. 20, the sharp corners or edges of the feed pin 39 are adapted to engage in the swage under the front of the tooth. Thus the feeding will be of a character to insure uniform grinding or facing off of the swaged saw teeth. Both in Fig. 2 and in Fig. 11 the feed pin and its mounting—the feed finger—can be maintained at any working level, according to the length and slope of the latter, and as may be found desirable. In other words, the pin and its mountings can be reciprocated in any one of a plurality of parallel planes.

I claim:—

1. In a saw sharpening machine, a guide mounted on the frame of the machine, a reciprocable feed finger, an adjustable and removable feed pin seated in said feed finger, a spring clamping plate for said feed pin mounted on the upper side of said feed finger, a guide block, and screws for adjustably clamping said guide block to the under side of the feed finger, one of said screws passing through the clamp spring and serving to removably hold the same in place, and a lateral guide pin carried by the guide block at a point below the feed pin, for the purpose set forth.

2. In a saw-sharpening machine, a feed-finger and means for reciprocating it, said feed-finger having a transverse angular seat in its upper side, a feed-pin shaped in cross-section to fit down into said seat, a spring-clamp-plate and means for clamping it down on the face of said feed-finger, the outer edge of said plate having a broad resilient bearing upon the upper face of the feed-pin and its inner edge being provided with a downwardly-turned flange bearing upon the face of the feed-finger.

3. In a saw-sharpening machine, a suitable guide on the machine frame, a reciprocable feed-finger carrying a laterally extending feed-pin, a guide block, clamp screws securing this guide block adjustably to the under side of said feed-finger, said guide block being vertically split at its forward end and having a transverse hole extending through said split portions, a bearing or supporting pin 43 extending through said hole and adapted to rest on the aforesaid guide on the machine frame, and a clamp screw connecting the two members formed by the split, substantially as set forth.

Signed by me at Chicago, Cook county, Illinois this 6th day of Feb. 1906.

LARS LARSEN FILSTRUP.

Witnesses:
F. H. DRURY,
ALBERT JOHN SAUSER.